3,085,379
PURIFICATION OF LIGHT GASES WITH
MOLECULAR SIEVES
Kazuo Kiyonaga, Buffalo, N.Y., and Marvin L. Suval,
North Bergen, N.J., assignors to Union Carbide Corporation, a corporation of New York
Filed Mar. 9, 1960, Ser. No. 13,859
18 Claims. (Cl. 55—23)

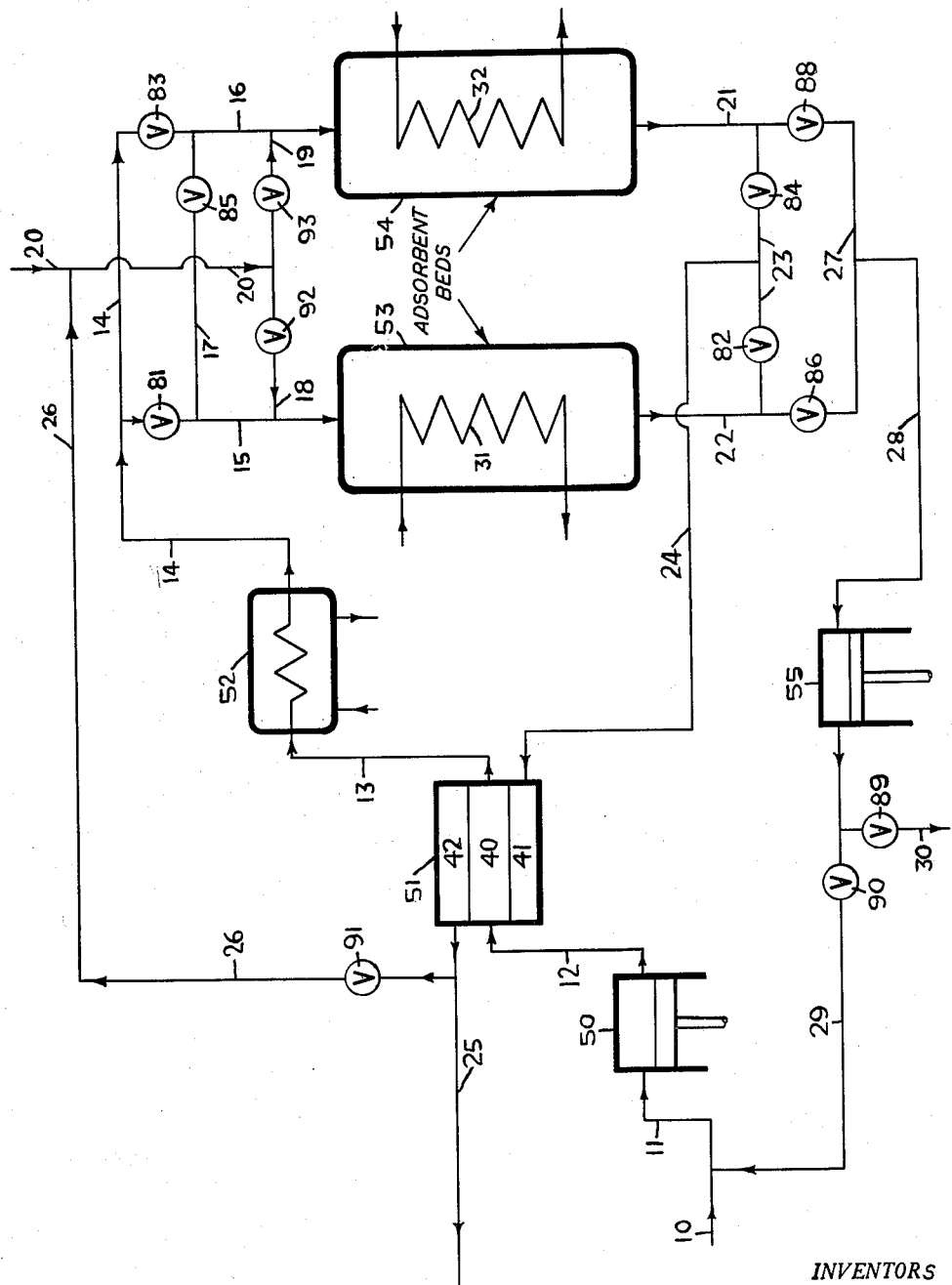

This invention relates to an improved process for separating a minor amount of impurities from a gas stream and more particularly to an improved process for adsorbing impurities from a gas stream as, for example, removing air traces from a helium feed gas.

The use of selective adsorbents to separate mixtures of fluids is known. Zeolitic molecular sieves have more recently been used for this type of separation. These zeolitic molecular sieves are especially useful when purifying gas streams containing impurities which are more strongly adsorbed than the desired gas components.

According to the prior art using zeolitic molecular sieves as the selective adsorbent, the incoming gas stream containing low concentrations of impurities is passed through a bed of zeolitic molecular sieves thereby adsorbing the impurities and obtaining a purified product gas. These prior art methods provide for the zeolitic molecular sieve bed to be desorbed in a manner such that the desorbate gas stream is completely discarded. Although the purified product gas can be obtained by these prior art systems with little or no impurities remaining after the adsorption stroke, the discarded desorbate gas stream will always contain a quantity of the product gas as well as the impurities.

Depending upon the nature and concentration of the impure component involved, the temperature and pressure at which adsorption is conducted, and the volume of free spaces provided in the adsorbent, the amount of desired gas entrapped with the impurity during adsorption can vary from a negligible to a considerable fraction of the total quantity being processed. When removing low concentrations of impurities that are only slightly adsorbable on zeolitic molecular sieve materials at normal temperatures and pressures, it often becomes necessary to operate at high pressures and/or low temperatures to effect the desired purifications with satisfactory yields of product gas. The loss of the gas being purified in the desorbate gas stream may be considerable under such operating conditions and can make such a process uneconomical.

One method of reducing the loss of the gas being purified is to carry out additional selective adsorption separations on the impurity or desorbate gas stream. Each additional separation, of course, requires a complete adsorption-desorption system with all the necessary components such as adsorbent-filled chambers, valves, pumps, controls, and the like. It will be apparent that such a system would be excessively expensive to construct and operate.

One object of the present invention is to provide an improved process for removing low concentrations of impurities from a gas stream which will yield a high recovery of purified gas.

Another object of this invention is to provide an improved process for removing low concentrations of impurities from a gas stream under economical pressure and temperature operating conditions.

A further object of this invention is to provide a process for removing low concentrations of impurities from a gas stream which will yield a high recovery of purified gas without the use of multiple contacting stages.

Still further objects and advantages of the present invention will be apparent from the ensuing description and accompanying drawing.

The novel process employs fixed beds of adsorbent in two chambers so that the temperature and/or pressure is changed as a particular chamber is switched from an adsorption stroke to a desorption stroke.

An important feature of the present process is the recycling of at least a portion of the desorbate gas stream to an incoming fresh gas stream containing low concentrations of impurities. In this manner, an impurities-containing feed gas stream is formed which is passed through the selective adsorbent during the adsorption stroke. The recycled desorbate gas stream contains a greater concentration of impurities than the incoming fresh gas stream and therefor increases the percentage of impurities entering the selective adsorbent bed as the impurities-containing feed gas stream. This results in a higher loading of the impurity on the adsorbent. Consequently, the desorption stream, a part of which is vented off as the impurity stream, has a higher concentration of the impure components and a lower concentration of the product gas. Any product gas contained in the recycled portion of the desorbate stream is available for further recovery in the adsorption stroke. Product gas in the desorbate stream is primarily due to entrapment in the voids during the adsorption stroke. By thus raising the concentration of the impurity in the vented gas, the proportion of product gas thus vented can be controlled to low levels. This results in a higher percentage recovery of purified product gas.

Certain adsorbents which selectivity adsorb molecules on the basis of size and shape of the adsorbate molecule are referred to as molecular sieves. Zeolites are metal alumino-silicates which exist in crystalline form. Only the zeolites having the basic formula:

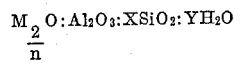

$$M_{\frac{2}{n}}O:Al_2O_3:XSiO_2:YH_2O$$

where M represents a metal cation and $n$ its valence, are termed zeolitic molecular sieves. In general, a particular crystalline zeolite will have values for X and Y that fall within a definite range.

The fundamental "building block" of any zeolite crystal is a tetrahedron of four oxygen ions surrounding a smaller silicon or aluminum ion. Each of the oxygen ions has two negative charges; each silicon ion has four positive charges; each aluminum ion, three. A silicon thus takes on a "half-interest" in the eight charges of the four oxygens which surround it. Each oxygen retains one negative charge which enables it to combine with another silicon or aluminum ion and extend the crystal lattice in all directions. The aluminum ion, with one less positive charge than the silicon, can only satisfy three negative charges of the four oxygens which surround it. To produce a stable crystal structure it must have the help of another positively charged ion. This is the function of the metal cation "M."

The structure of most crystals extends uniformly in all directions without leaving empty spaces. In zeolitic molecular sieves, however, the framework of silicon-oxygen and aluminum-oxygen tetrahedra forms a structure which is honeycombed with relatively large cavities which are normally filled wtih water molecules. The size and shape of these cavities depends on the variety of the zeolite.

The zeolitic molecular sieves as described above may be activated by heating to effect the loss of the water of hydration. The dehydration results in crystals interlaced with channels of molecular dimensions that offer very high surface areas for the adsorption of foreign particles.

Adsorption is limited to molecules having size and shape such as to permit entrance through the pores which connect to the inner sorption areas or cavities, all other molecules being excluded. The pore size can be varied within limits, by replacement, in part or entirely, of the metal cations "M" with smaller or larger cations. Such ion-exchange is accomplished by conventional ion-exchange techniques.

The zeolitic molecular sieves contemplated herein exhibit adsorptive properties that are unique among known adsorbents which make them a preferred selective adsorbent for this invention. The common adsorbents, as for example, charcoal and silica gel, exhibit adsorption selectivities based primarily on the boiling point or critical temperature of the adsorbate. Activated zeolitic molecular sieves on the other hand exhibit a selectivity based on the size and shape of the adsorbate molecule. Among those adsorbate molecules whose size and shape are such as to permit adsorption by zeolitic molecular sieves, a very strong preference is exhibited toward those that are polar, polarizable, or unsaturated. Another property of zeolitic molecular sieves that contributes to its novel position among adsorbents is that of adsorbing large quantities of adsorbate either at very low pressures, at very low partial pressures, or at very low concentrations. One or a combination of one or more of these three particular adsorption characteristics or others make zeolitic molecular sieves useful for numerous gas or liquid separation processes where adsorbents are not now employed. The use of zeolitic molecular sieves permits more efficient and more economical operation of numerous processes now employing other adsorbents.

Zeolite A, a zeolitic molecular sieve, is described in U.S. Patent No. 2,882,243, issued April 14, 1959, and is the preferred selective adsorbent for the separation of air from helium or methane from hydrogen. The general formula for zeolite A is written as follows:

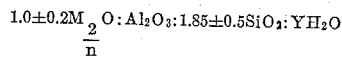

$$1.0 \pm 0.2 M_{\frac{2}{n}} O : Al_2O_3 : 1.85 \pm 0.5 SiO_2 : YH_2O$$

In this formula M is a metal cation, $n$ is its valence, and Y may be any value up to 6 depending on the identity of the metal and the degree of dehydration of the crystals.

As already discussed, the pore size of a particular crystalline zeolite is determined by the metal cation M that it contains. Both the air from helium and methane from hydrogen separations require a zeolitic molecular sieve having a pore size of at least 4 angstrom units. It has been discovered, however, that in the air from helium separation a zeolitic molecular sieve having a pore size of at least 5 angstrom units is the preferred adsorbent because of the greater rate of adsorption of air by sieves having pore sizes of at least 5 angstrom units from those of about 4 angstrom units. Sodium zeolite A (zeolite A having sodium as the metal cation) is the preferred selective adsorbent for the methane from hydrogen separation because of its pore size of about 4 angstrom units. Ion-exchanging at least 40 percent of the sodium of zeolite A with calcium provides the preferred selective adsorbent for the air from helium separation since its pore size is about 5 angstrom units.

Zeolitic molecular sieves having pore sizes which make them suitable for use in the process of this invention include the following:

Monovalent cation forms of zeolite A, excepting the potassium form which has a pore size of about 3 A., which have a pore size of about 4 A.

Zeolite A, in which at least about 40 percent of the monovalent cation sites are satisfied with di or trivalent metal cations, which has a pore size of about 5 A.

Both the natural and the synthetic forms of mordenite which have a pore size of about 4 A. and the hydrogen ion-exchanged form of mordenite which has a pore size of about 5 A.

Chabazite, a naturally occurring zeolite, which has a pore size of about 4 A.

Erionite, a naturally occurring zeolite which has a pore size of about 5 A.

Synthetic zeolite R which has a pore size of about 4 A., is described and claimed in U.S. Patent No. 3,030,181, issued April 17, 1962.

Synthetic zeolite D which is described in U.S. patent application Serial No. 680,383 filed August 26, 1957, in the names of D. W. Breck and N. A. Acara which has a pore size of about 4 A.

Synthetic zeolite L which is described in U.S. patent application Serial No. 711,565 filed January 28, 1958, now abandoned, in the names of D. W. Breck and N. A. Acara which has a pore size of about 10 A.

Synthetic zeolite Y which is described in U.S. patent application Serial No. 109,487, filed May 19, 1961, in the name of D. W. Breck, which has a pore size of about 10 A.

Synthetic zeolite T which has a pore size of about 5 A., is described and claimed in U.S. Patent No. 2,950,952, issued August 30, 1960.

Synthetic zeolite X which is described in U.S. Patent No. 2,882,244 issued April 14, 1959, which has a pore size of about 10 A.

Referring now more specifically to the drawing, the impurities-containing feed gas stream is directed through conduit 11 to the compressor 50. After being compressed, the impurities-containing feed gas stream is preferably directed through conduit 12 to the passageway 40 of heat-exchanger 51 and thence through conduit 13 to cooler 52 where it is further cooled. Switching valve 81 in conduit 15 is open allowing the compressed and cooled impurities-containing feed gas stream coming from conduit 14 to be directed through conduit 15 into the first selective adsorbent bed 53. In passing through the first selective adsorbent bed 53, the feed gas stream has adsorbed within the adsorbent its impurities as well as a quantity of entrapped product gas. The gas stream flowing out of the adsorbent bed 53 into conduit 22 is a substantially purified product gas stream. Switching valve 82 in conduit 23 is open allowing the purified product gas stream to pass from conduit 22 through conduit 23 and thence to conduit 24. Conduit 24 directs the purified product gas stream through passageways 41 and 42 of heat-exchanger 51 where its refrigeration is recovered. The purified product gas is then directed through conduit 25 to product storage.

After the adsorption stroke, valve 85 located in conduit 17 is opened with switching valves 83, 84, 88 and valves 89 and 90 located respectively in conduits 16, 23, 21 and 30 and 29 closed. This equalizes the pressure in the two selective adsorbent beds 53 and 54. After the pressure is equalized in the two beds, valve 85 in conduit 17 is closed and switching valves 81 and 82 located in conduits 15 and 23, respectively, are closed. Switching valve 83 in conduit 16 is simultaneously opened thereby directing the feed gas stream in conduit 14 through conduit 16 into the second selective adsorbent bed 54. Switching valve 84 in conduit is open allowing the product gas stream to pass through conduits 21, 23 and 24 and thence through passageways 41 and 42 of heat-exchange 51 and conduit 25 to product storage.

While the impurities-containing feed gas stream is passing through the second selective adsorbent bed 54, switching valve 86 in conduit 22 and control valves 89 and 90 in conduits 30 and 29, respectively are opened to regulate the desorption of the loaded or adsorbed impurities and entrapped product gas contained in the first selective adsorbent bed 53. The vacuum pump 55 now operates so as to depressurize the adsorbent bed 53 and desorb the impurities and entrapped gas molecules by drawing a desorbate gas stream through the adsorbent bed 53 and conduits 22, 27, 28 and 29. Valve 89 is open to allow a portion of the desorbate gas stream to be discarded through conduit 30. The remaining desorbate gas stream is directed through conduit 29 and control valve 90 therein for mixing with the incoming fresh gas stream containing low concentrations of impurities from conduit 10 so as to form the impurities-containing feed gas stream flowing through conduit 11.

The cycle is repeated for the second selective adsorbent but switching valves 83, 84, and 88 and conduits 16, and 21 are substituted for switching valves 81, 82 and 86 and conduits 15, and 22, respectively.

Instead of continually discarding a portion of the desorbate gas stream through conduit 30 and valve 89 during the entire desorption stroke, a portion of the desorbate gas stream may be discarded at a particular time. The product gas molecules entrapped in the adsorbent bed after the adsorption stroke are more easily removed than the impurities and consequently the initial or first desorbate gas stream is somewhat richer in product gas. During the initial part of desorption, valve 89 may be closed and valve 90 opened thereby allowing the richer product gas first desorbate gas stream to be recycled through conduit 29. During the latter part of the desorption stroke, valve 89 is opened and valve 90 closed thereby passing the impurities rich tail-end desorbate gas stream through conduit 30 to be discarded.

In another embodiment, the desorption stroke may be accomplished by applying heat to the selective adsorbent beds 53 and 54 by heat-exchange means through conduits 31 and 32 embedded in the first and second adsorbent beds, respectively, at the same time as the pressure is being reduced within the adsorbent bed. In some instances, heat alone may be used to effect the desorption.

Heat may also be introduced to the adsorbent bed by passing a heated purge gas stream therethrough. During the desorption stroke, valves 92 or 93 located in conduits 18 and 19, respectively, can be opened, depending on which adsorbent bed is to be desorbed, thereby allowing a heated purge gas stream to pass consecutively through conduits 20, 18 or 19 and 15 or 16 and then the adsorbent bed. The heated purge gas stream may be a portion of the pure product gas stream by opening valve 91 which directs the gas stream through conduit 26 to conduit 20.

A combination of the above embodiments of the invention is found particularly advantageous in some instances. As before, during the desorption stroke, valve 89 is closed and valve 90 is opened thereby recycling the richer product gas desorbate gas stream. Valve 89 is then opened and valve 10 closed allowing the impurities rich tail-end desorbate gas stream through conduit 30 to be discarded. Simultaneously, valve 92 or 93, depending on which adsorbent is being desorbed, is opened allowing a heated purge gas stream to pass through the adsorbent bed. This embodiment is particularly useful when difficultly desorable impurities are present. Traces of moisture or high boiling or polymerizable hydrocarbons which tend to be accumulated in a zeolitic molecular sieve adsorbent bed may be efficiently removed in this manner.

The pressure and temperature of the adsorption and desorption strokes must be selected on the basis of the purification problem which is involved and to a certain extent on the other factors which control the economics of the operation.

The best operation, in the embodiment wherein the desorption stroke is carried out in its entirety without the introduction of heat, is achieved when the adsorption stroke is conducted at a temperature at least as high as the critical temperature of the impurity being adsorbed. When the desorption is conducted with the addition of heat, either by indirect means or by the use of a heated purge fluid, the desorption temperature should be at least as high as the critical temperature of the impurity being desorbed. The reason for the above preference for conduct of the process above certain critical temperatures is based on the fastest rates of desorption attained thereby.

The selection of the adsorption stroke temperature and pressure is determined by comparing the adsorptivity of the adsorbent for the impurities involved, as well as the economics of producing the desired purification temperature, with the gain in adsorptive capacity.

The selection of the desorption stroke pressure is more critical as it determines the purity of the gaseous product produced. The requirement is that at the end of the desorption stroke, the partial pressure of the impurities left on the adsorbent must be such that upon switching back to the adsorption stroke the partial pressure of the impurity divided by the total pressure of adsorption equals the tolerable impurities mole fraction in the product. For example, if a 99.9 percent pure product is required and the adsorption stroke pressure is 300 p.s.i.a, then the desorption stroke pressure should be about $$(1.00 - .999)\frac{(300)(760)}{14.7} = 15.5 \text{ mm. Hg (absolute)}$$

Thus, desorption is conducted until a residual impurity loading is obtained which corresponds to a partial pressure of about 15.5 mm. Hg at the adsorption temperature.

The effects of different adsorption pressures were determined using the present process for the removal of air from helium. The adsorbent used was zeolite A having a pore size of 5 angstrom units as described in United States Patent No. 2,882,243 issued April 14, 1959. The specifications for the helium purifier require an influent or incoming fresh helium gas stream of 600 lb./hr. of which 1 percent by volume was air and an effluent or product gas stream of 99.9 percent pure helium. Listed in Table A are the required operating conditions of the present process for three different pressures.

TABLE A

*Helium Purifier*

|  | Case I | Case II | Case III |
|---|---|---|---|
| Number of Adsorber Beds | 2 | 2 | 2 |
| Adsorption Pressure, p.s.i.g | 184.4 | 279.3 | 432.9 |
| Adsorption Temp., °F | −40 | −40 | −40 |
| Desorption Pres., mm. Hg abs | [1] 200 | [1] 200 | [1] 200 |
| Desorption Temperature | −40 | −40 | −40 |
| Zeolite A (5 A.) Molecular Sieve required, per bed, lbs | 5,960 | 3,815 | 2,400 |
| Impurities-containing feed: | | | |
| Helium, lb./hr | 626.4 | 623.8 | 622.4 |
| Air, lb./hr | 370.5 | 235.8 | 153.5 |
| Product: | | | |
| Helium, lb./hr | 596.4 | 594.6 | 591.2 |
| Air, lb./hr | | | |
| Desorbate Recycle: | | | |
| Helium, lb./hr | 26.4 | 23.8 | 22.4 |
| Air, lb./hr | 327.5 | 192.0 | 110.0 |
| Desorbate Vent: | | | |
| Helium, lb./hr | 3.6 | 5.4 | 8.8 |
| Air, lb./hr | 43.5 | 43.5 | 43.5 |
| Helium recovery, percent | 99.4 | 99.1 | 98.5 |
| Unit length, ft | 17.0 | 15.5 | 14.5 |
| Unit diameter, ft | 10.5 | 9.5 | 8.5 |
| Unit height, ft | 9.0 | 9.0 | 9.0 |
| Electric Power, kw | 35 | 35 | 35 |

[1] After reaching this desorption pressure, a small amount of purified product gas was passed to the bed to sweep out the air remaining in the bed while maintaining the desorption pressure of 200 mm. Hg abs.

It is at once noticed that as the adsorption pressure increases, the efficiency of recovery decreases. However, counteracting the increase of efficiency for lower pressures is the decrease in amount of zeolitic molecular sieve needed and the decrease in the amount of impurities-containing feed gas i.e., incoming fresh gas plus desorbate recycle, as the adsorption pressure is increased. As the amount of impurities-containing feed gas required increases, there must be a corresponding increase in the size of the compressor and cooling units of the process. The requirements for each individual application as well as the adsorbent used must dictate the correct pressure for adsorption to effect the greatest economies.

The process is adaptable to many situations in which low concentrations of impurities are to be removed from gases. As long as the impurity is more strongly adsorbed than the desired gas constituents, the present invention may be advantageously employed. The following list of impurities and gases is typical of the uses to which this process can be applied.

(1) Removal of oxygen, nitrogen, argon, krypton, ammonia, water, carbon dioxide, carbon monoxide and hydrogen sulfide from helium and hydrogen.

(2) Removal of hydrocarbon impurities such as methane, ethane, propane, butane, ethylene, propylene, butylene, and higher hydrocarbons from hydrogen, helium, argon, neon, krypton, oxygen, and nitrogen.

(3) Removal of carbon dioxide, hydrogen sulfide, ammonia, water, sulfur dioxide, from hydrogen, helium, nitrogen, argon, neon, krypton, oxygen.

In the following examples, the advantages of this invention for removing low concentration of impurities from helium and hydrogen are shown.

EXAMPLE 2

An incoming fresh helium gas stream flow at the rate of 100 moles/hr. and containing 1 percent by volume of air (99 moles/hr. of helium, 1 mole/hr. of air) was combined with a recycled desorbate gas stream containing 3.93 moles/hr. of helium and 4.42 moles/hr. of air. This feed gas stream formed, which was now 5 percent by volume of air (102.93 moles/hr. of helium and 5.42 moles/hr. of air), was compressed to 300 p.s.i.a., then heat-exchanged and cooled to −40° C. It was then passed through an adsorbent bed packed with zeolite A molecular sieve pellets having a pore size of about 5 angstrom units. The effluent gas stream of the adsorbent, consisting of 95.4 percent of the entering helium, entering the adsorbent bed during the adsorption stroke contained 98.11 moles/hr. of pure helium. This pure helium was heat-exchanged with the entering feed gas stream to recover its refrigeration and passed to product storage. During the desorption stroke, the remaining entrapped 4.82 moles/hr. of helium and adsorbed 5.42 moles/hr. of air were desorbed by depressurizing the adsorption bed using a vacuum until a final pressure of about 15 mm. Hg (absolute) was reached. The direction of gas flow during the desorption stroke was preferably opposite to the flow direction during adsorption in order to take advantage of the chromatographic effect which would occur. As an alternative, a higher desorption stroke pressure may be used, as for example, 200 mm. Hg. However, in ths case, when the desorption pressure of 200 mm. Hg is reached a small amount of purified product gas is added to the bed to sweep out the air remaining in the bed while maintaining the desorption stroke pressure of 200 mm. Hg (absolute). This is done until a residual loading of air corresponding to a partial pressure of 15 mm. Hg at the adsorption temperature is obtained. This is necessary to maintain the desired purity of the helium product during the adsorption stroke. A portion of the desorbate gas stream, 1 mole/hr. air, 0.89 mole/hr. helium, containing the same total quantity of air as was entering the system in the incoming fresh helium gas stream was vented as waste gas and the remaining (3.83 mole/hr. of helium, 4.42 moles/hr. of air) desorbate gas stream was recycled to combine with the incoming fresh helium gas stream and the cycle was repeated.

This process yielded a helium recovery of at least 99 percent with a purity of practically 100 percent while the operation of a single-stroke purification system of the same incoming fresh gas stream at the same temperature and pressure and using the same molecular sieve adsorbent yielded 90 percent of 99 moles/hr. or 89 moles/hr. of helium which is approximately 90 percent recovery.

EXAMPLE 2

An incoming fresh hydrogen gas stream flow at the rate of 100 moles/hrs. and containing 10 percent methane (90 moles/hr. of $H_2$, 10 moles/hr. of $CH_4$) was combined with a recycled desorbate gas stream containing 4.68 mole/hr. of $H_2$ and 29.32 moles/hr. of $CH_4$. The feed gas stream formed, 94.68 moles/hr. of $H_2$, 39.32 moles/hr. of $CH_4$, which was now 29 percent by volume $CH_4$ was compressed to 50 p.s.i.a., then heat-exchanged and cooled to 0° C. It was then passed through an adsorbent bed packed with zeolite A molecular sieve pellets, having a bore size of about 4 angstrom units. The effluent gas stream of the adsorbent, consisting of 93.3 percent of the entering hydrogen, contained 88.40 moles/hr. of pure hydrogen. This purified hydrogen was heat-exchanged with the entering feed gas stream to recover the refrigeration and passed to product storage. During the desorption stroke, the remaining entrapped 6.28 moles/hr. of hydrogen and adsorbed 39.32 moles/hr. of methane were desorbed by depressurizing the adsorption bed using a vacuum until a final presure of about 2.6 mm. Hg (absolute) was reached. Alternatively, desorption may be conducted at more moderate vacuums or pressures. However, in this case, when the more moderate desorption pressure is reached, a small amount of purified product gas is added to the bed to sweep out the methane remaining in the bed while maintaining the more moderate desorption pressure. This is done until a residual loading of methane corresponding to a partial pressure of 2.6 mm. Hg at the adsorption temperature is obtained. The direction of gas flow during the desorption stroke was preferably opposite to the flow direction during the adsorption stroke in order to take advantage of the chromatographic effect which would occur. A portion of the desorbate gas stream, 10 moles/hr. of $CH_4$, 1.6 moles/hr. of hydrogen containing the same total quantity of air as was entering the system in the incoming fresh hydrogen gas stream was vented as waste gas and the remaining (4.68 moles/hr. $H_2$ 29.32 moles/hr. $CH_4$) desorbate gas stream was recycled to combine with the incoming fresh hydrogen gas stream and the cycle was repeated.

To illustrate the advantages of this novel process, assume the same temperature and pressure conditions for treating the incoming fresh hydrogen gas stream of 90 moles/hr. $H_2$ and 10 moles/hr. of methane without a recycle desorbate gas stream. According to the prior art all the desorbate was discarded. When adsorption is stopped, the adsorbent bed will contain not only adsorbed methane, but also hydrogen in the void spaces. For the conditions given, if complete desorption was achieved by total vacuum, every mole of methane desorbed will be accompanied by approximately 0.6 mole of hydrogen to give a 93 percent recovery of purified hydrogen whereas the proposed process has a 98+ percent recovery of hydrogen.

The process of this invetnion may also be employed to recover, when desired, the adsorbable but low concentrations of impurities in higher concentrations than obtainable from conventional adsorption recovery processes.

Although preferred embodiments of this invention have been described in detail, it is contemplated that modifications of the process may be made and that some features may be employed without others, all within the spirit and scope of the invention.

What is claimed is:

1. A process for removing low concentrations of impurities from a gas stream comprising the steps of providing at least two separate zones, each containing a zeolitic molecular sieve adsorbent bed which has a selectivity for the impurities over the product component of said gas stream; providing an impurities-containing feed gas stream; passing said feed gas stream through a first selective adsorbent bed as an adsorption stroke thereby removing at least most of the impurities from said feed gas stream; discharging a substantially impurities-free product gas stream from said first selective adsorbent bed; simultaneously depressurizing a second selective adsorbent bed as a desorption stroke thereby removing previously deposited impurities and entrapped product gas in a desorbate gas stream; recycling a sufficient part of the desorbate gas stream directly to an incoming fresh gas stream to form said impurities-containing feed gas stream having a higher concentration of impurities than said fresh gas stream; periodically switching the flows between the two selective adsorbent beds so that said impurities-containing feed gas stream flows through the second selective adsorbent bed and said desorbate gas stream is removed from the first selective adsorbent bed.

2. A process for removing low concentrations of impurities from a gas stream comprising the steps of providing at least two separate zones, each containing zeolitic molecular sieve adsorbent bed which has a selectivity for the impurities over the product component of said gas stream; providing an impurities-containing feed gas stream and compressing such feed gas stream; passing said compressed feed gas stream through a first selective adsorbent bed as an adsorption stroke thereby removing at least most of the impurities from said feed gas stream; discharging a substantially impurities-free compressed product gas stream from said first selective adsorbent bed; simultaneously depressurizing a second selecitve adsorbent bed as a desorption stroke thereby removing previously deposited impurities and entrapped product gas in a desorbate gas stream; recycling a sufficient part of the desorbate gas stream directly to an incoming fresh gas stream to form said impurities-containing feed gas stream having a higher concentration of impurities than said fresh gas stream; periodically switching the flows between the two selective adsorbent beds so that said impurities-containing feed gas stream flows through the second selective adsorbent bed and said desorbate gas stream is removed from the first selective adsorbent bed.

3. A process for removing low concentrations of impurities from a gas stream comprising the steps of providing at least two separate zones, each containing a zeolitic molecular sieve adsorbent bed which has a selectivity for the impurities over the product component of said gas stream; providing an impurities-containing feed gas stream and compressing such feed gas stream; passing said compressed feed gas stream through a first selective adsorbent bed as an adsorption stroke thereby removing at least most of the impurities from said feed gas stream; discharging a substantially impurities-free compressed product gas stream from said first selective adsorbent bed; simultaneously depressurizing a second selective adsorbent bed as a desorption stroke until a residual impurity loading is obtained which corresponds to a partial pressure at adsorption temperature equal to about the adsorption stroke pressure multiplied by the tolerable impurities mole fraction in the product, thereby removing previously deposited impurities and entrapped product gas in a desorbate gas stream; recycling a sufficient part of the desorbate gas stream directly to an incoming fresh gas stream to form said impurities-containing feed gas stream having a higher concentration of impurities than said fresh gas stream; periodically switching the flows between the two selective adsorbent beds so that said impurities-containing feed gas stream flows through the second selective adsorbent bed and said desorbate gas stream is removed from the first selective adsorbent bed.

4. A process for removing low concentrations of impurities from a gas stream comprising the steps of providing at least two separate zones, each containing a zeolitic molecular sieve adsorbent bed which has a selectivity for the impurities over the product component of a gas stream; providing an impurities-containing feed gas stream and compressing such feed gas stream; cooling said compressed feed gas stream by heat-exchange with a first colder fluid; passing the cooled gas stream through a first selective adsorbent bed as an adsorption stroke thereby removing at least most of the impurities from said gas stream; discharging a substantially impurities-free compressed and cooled product gas stream from said first selective adsorbent bed for heat-exchange with the compressed impurities-containing feed gas stream as said first colder fluid; simultaneously depressurizing a second selective adsorbent bed as a desorption stroke until a residual impurities loading is obtained which corresponds to a partial pressure at adsorption temperature equal to about the adsorption stroke pressure multiplied by the tolerable impurities mole fraction in the product gas stream thereby removing previously deposited impurities and entrapped product gas in a desorbate gas stream; recycling a sufficient part of the desorbate gas stream directly to an incoming fresh gas stream to form said impurities-containing feed gas stream having a higher concentration of impurities than said fresh gas stream; periodically switching the flows between the two selective adsorbent beds so that said impurities-containing feed gas stream flows through the second selective adsorbent bed and said desorbate gas stream is removed from the first selective adsorbent bed.

5. A process as set forth in claim 1 wherein at least part of said desorbate gas stream is recycled to said incoming fresh gas stream containing low concentrations of impurities during the first part of said desorption stroke and discarded during the last part of such stroke.

6. A process as set forth in claim 1 wherein heat is introduced to each adsorbent bed during its desorption stroke.

7. A process as set forth in claim 1 wherein a heated purge gas is passed through each adsorbent bed during the last part of its desorption stroke.

8. A process as set forth in claim 4 wherein a portion of the product gas stream after being heated-exchanged as the first colder fluid is passed through each adsorbent bed during the last part of the desorption stroke.

9. A process as set forth in claim 4 wherein the impurities containing feed gas stream is cooled to a temperature at most as low as the critical temperature of the impurities being adsorbed.

10. A process for removing low concentrations of air from helium comprising the steps of providing at least two separate zones, each containing a zeolitic molecular sieve adsorbent bed which has a selectivity for air over helium; providing an air containing helium feed gas stream and compressing said air-containing helium feed gas stream; cooling the compressed air-containing helium feed gas stream to at most as low as the critical temperature of air by heat-exchange with a first colder fluid; passing the cooled and compressed air-containing helium feed gas stream through the first zeolitic molecular sieve adsorbent bed as an adsorption stroke thereby removing at least most of the air from said air-containing helium feed gas stream; discharging a substantially air-free compressed helium gas stream from said first zeolitic molecular sieve adsorbent bed for heat-exchange with said compressed air containing helium feed gas stream as said first colder fluid; simultaneously depressurizing and drawing a vacuum on the second zeolitic molecular sieve adsorbent bed as a desorption stroke until a residual air loading is obtained which corresponds to a partial pressure at adsorption temperature equal to about the adsorption stroke pressure multiplied by the tolerable air mole fraction in the product helium gas stream, thereby removing previously deposited air and entrapped helium gas in a desorbate gas stream; recycling one portion of the desorbate gas stream to an incoming fresh helium gas stream containing low concentrations of air thereby forming said air containing helium feed gas stream for passage to said first zeolitic molecular sieve adsorbent bed for said adsorption stroke and discarding the other portion of the desorbate gas stream containing the same total quantity of air as is entering the system in said incoming fresh helium gas stream during said adsorption stroke; periodically switching the flows between the two zeolitic molecular sieve adsorbent beds so that said air containing helium feed gas stream flows through the second zeolitic molecular sieve adsorbent bed and said desorbate gas stream is removed from the first zeolitic molecular sieve adsorbent bed.

11. A process for removing low concentrations of air from helium comprising the steps of providing at least two separate zones, each containing a zeolitic molecular sieve adsorbent bed wherein the zeolitic molecular sieve adsorbent is chosen from the group consisting of zeolite A in which at least 40 percent of the monovalent cation sites are satisfied with trivalent metal cations, zeolite A in which at least 40 percent of the monovalent cation sites are satisfied with divalent metal cations, hydrogen ion-exchanged form of mordenite, erionite, zeolite L, zeolite T, zeolite Y and zeolite X; providing an air containing helium feed gas stream and compressing said air-containing helium feed gas stream; cooling the compressed air-containing helium feed gas stream to at most as low as the critical temperature of air by heat-exchange with a first colder fluid; passing the cooled and compressed air-containing helium feed gas stream through the first zeolitic molecular sieve adsorbent bed as an adsorption stroke thereby removing at least most of the air from said air-containing helium feed gas stream; discharging a substantially air-free compressed helium gas stream from said first zeolitic molecular sieve adsorbent bed for heat-exchange with said compressed air containing helium feed gas stream as said first colder fluid; simultaneously depressurizing and drawing a vacuum on the second zeolitic molecular sieve adsorbent bed as a desorption stroke until a residual air loading is obtained which corresponds to a partial pressure at adsorption temperature equal to about the adsorption stroke pressure multiplied by the tolerable air mole fraction in the product helium gas stream thereby removing previously deposited air and entrapped helium gas in a desorbate gas stream; recycling one portion of the desorbate gas stream to an incoming fresh helium gas stream containing low concentrations of air thereby forming said air containing helium feed gas stream for passage to said first zeolitic molecular sieve adsorbent bed for said adsorption stroke and discarding the other portion of the desorbate gas stream containing the same total quantity of air as is entering the system in said incoming fresh helium gas stream during said adsorption stroke; periodically switching the flows between the two zeolitic molecular sieve adsorbent beds so that said air containing helium feed gas stream flows through the second zeolitic molecular sieve adsorbent bed and said desorbate gas stream is removed from the first zeolitic molecular sieve adsorbent bed.

12. A process as set forth in claim 10 wherein the zeolitic molecular adsorbent beds are composed of zeolite A having a pore size of about 5 angstrom units; said helium feed gas stream is compressed to about 300 p.s.i.a. and cooled to about −40° C.; and the vacuum for the desorption stroke is about 15 mm. Hg.

13. A process for removing low concentrations of air from helium comprising the steps of providing at least two separate zones, each containing an adsorbent bed composed of zeolite A having a pore size of about 5 A.; providing an air-containing helium feed gas stream and compressing said air-containing helium gas stream to about 300 p.s.i.a.; cooling the compressed air-containing helium feed gas stream by heat-exchange with a first colder fluid to about −40° C.; passing the cooled and compressed air-containing helium feed gas stream through the first zeolite A adsorbent bed as an adsorption stroke thereby removing at least most of the air from said air-containing helium feed gas stream; discharging a substantially air-free compressed helium gas stream from said first zeolite A adsorbent bed for heat-exchange with said compressed air containing helium feed gas stream as said first colder fluid; simultaneously depressurizing the second zeolite A adsorbent bed and then passing a portion of the product gas stream after being heat-exchanged as the first colder fluid through the adsorbent bed until a residual loading of air corresponding to a partial pressure of 15 mm. Hg at the adsorption temperature is obtained thereby completing the desorption stroke and removing previously deposited air and entrapped helium gas in a desorbate gas stream; recycling one portion of the desorbate gas stream to an incoming fresh helium gas stream containing low concentrations of air thereby forming said air containing helium feed gas stream for passage to said first zeolitic molecular sieve adsorbent bed for said adsorption stroke and discarding the other portion of the desorbate gas stream containing the same total quantity of air as is entering the system in said incoming fresh helium gas stream during said adsorption stroke; periodically switching the flows between the two zeolitic molecular sieve adsorbent beds so that said air containing helium feed gas stream flows through the second zeolitic molecular sieve adsorbent bed and said desorbate gas stream is removed from the first zeolitic molecular sieve adsorbent bed.

14. A process for removing low concentrations of air from helium comprising the steps of providing at least two separate zones, each containing an adsorbent bed composed of zeolite A having a pore size of about 5 A.; providing an air-containing helium feed gas stream and compressing said air-containing helium gas stream to about 300 p.s.i.a.; cooling the compressed air-containing helium feed gas stream by heat-exchange with a first colder fluid to about −40° C.; passing the cooled and compressed air-containing helium feed gas stream through the first zeolite A adsorbent bed as an adsorption stroke thereby removing at least most of the air from said air-containing helium feed gas stream; discharging a substantially air-free compressed helium gas stream from said first zeolite A adsorbent bed for heat-exchange with said compressed air containing helium feed gas stream as said first colder fluid; simultaneously depressurizing the second zeolite A adsorbent bed to about 200 mm. Hg and then passing a portion of the product gas stream after being heat-exchanged as the first colder fluid through the adsorbent bed until a residual loading of air corresponding to a partial pressure of 15 mm. Hg at the adsorption temperature is obtained thereby completing the desorption stroke and removing previously deposited air and entrapped helium gas in a desorbate gas stream; recycling one portion of the desorbate gas stream to an incoming fresh helium gas stream containing low concentrations of air thereby forming said air containing helium feed gas stream for passage to said first zeolitic molecular sieve adsorbent bed for said adsorption stroke and discarding the other portion of the desorbate gas stream containing the same total quantity of air as is entering the system in said incoming fresh helium gas stream during said adsorption stroke; periodically switching the flows between the two zeolitic molecular sieve adsorbent beds so that said air containing helium feed gas stream flows through the second zeolitic molecular sieve adsorbent bed and said desorbate gas stream is removed from the first zeolitic molecular sieve adsorbent bed.

15. A process for removing low concentrations of methane from hydrogen comprising the steps of providing at least two separate zones, each containing a zeolitic molecular sieve adsorbent bed having a selectivity for methane over hydrogen; providing a methane-containing hydrogen feed gas stream and compressing said methane-containing hydrogen feed gas stream; cooling the compressed methane-containing hydrogen feed gas stream to at most as low as the critical temperature of methane by heat-exchange with a first colder fluid; passing the cooled methane-containing hydrogen feed gas stream through the first zeolitic molecular sieve adsorbent bed as an adsorption stroke thereby removing at least most of the methane from said methane-containing hydrogen feed gas stream; discharging a substantially methane-free compressed hydrogen gas stream from said first zeolitic molecular sieve adsorbent bed for heat-exchange with the compressed methane-containing hydrogen feed gas stream as said first colder fluid; simultaneously depressurizing and drawing a vacuum on the second zeolitic molecular sieve adsorbent bed as a desorption stroke until a residual methane loading is obtained which corresponds to a partial pressure at adsorption temperature equal to about the adsorption stroke pressure multiplied by the tolerable methane mole fraction in the product hydrogen gas stream thereby removing previously deposited methane and entrapped hydrogen gas in a desorbate gas stream; recycling one portion of the desorbate gas stream to an incoming fresh hydrogen gas stream containing low concentrations of methane-containing hydrogen feed gas stream for passage to said first zeolitic molecular sieve adsorbent bed for said adsorption stroke and discarding the other portion of the desorbate gas stream containing the same total quantity of methane as is entering the system in said incoming fresh hydrogen gas stream during said adsorption stroke; periodically switching the flows between the two zeolitic molecular sieve adsorbent beds so that said methane-containing hydrogen feed gas stream flows through the second zeolitic molecular sieve adsorbent bed and said desorbate gas stream is removed from the first zeolitic molecular sieve adsorbent bed.

16. A process for removing low concentrations of methane from hydrogen comprising the steps of providing at least two separate zones, each containing a zeolitic molecular sieve adsorbent bed wherein the zeolitic molecular sieve adsorbent is chosen from the group consisting of zeolite A, mordenite, chabazite, erionite, zeolite R, zeolite D, zeolite L, zeolite Y, zeolite T and zeolite X; providing a methane-containing hydrogen feed gas stream and compressing said methane-containing hydrogen feed gas stream; cooling the compressed methane-containing hydrogen feed gas stream to at most as low as the critical temperature of methane by heat-exchange with a first colder fluid; passing the cooled methane-containing hydrogen feed gas stream through the first zeolitic molecular sieve adsorbent bed as an adsorption stroke thereby removing at least most of the methane from said methane-containing hydrogen feed gas stream; discharging a substantially methane free compressed hydrogen gas stream from said first zeolitic molecular sieve adsorbent bed for heat-exchange with the compressed methane-containing hydrogen feed gas stream as said first colder fluid; simultaneously depressurizing and drawing a vacuum on the second zeolitic molecular sieve adsorbent bed as a desorption stroke until a residual methane loading is obtained which corresponds to a partial pressure at adsorption temperature equal to about the adsorption stroke pressure multiplied by the tolerable methane mole fraction in the product hydrogen gas stream thereby removing previously deposited methane and entrapped hydrogen gas in a desorbate gas stream; recycling one portion of the desorbate gas stream to an incoming fresh hydrogen gas stream containing low concentrations of methane-containing hydrogen feed gas stream for passage to said first zeolitic molecular sieve adsorbent bed for said adsorption stroke and discarding the other portion of the desorbate gas stream containing the same total quantity of methane as is entering the system in said incoming fresh hydrogen gas stream during said adsorption stroke; periodically switching the flows between the two zeolitic molecular sieve adsorbent beds so that said methane-containing hydrogen feed gas stream flows through the second zeolitic molecular sieve adsorbent bed and said desorbate gas stream is removed from the first zeolitic molecular sieve adsorbent bed.

17. A process as set forth in claim 15 wherein the zeolitic molecular adsorbent beds are composed of zeolite A having a pore size of about 4 angstrom units, said methane-containing hydrogen feed gas stream is compressed to about 50 p.s.i.a. and cooled to about 0° C., and the vacuum for the desorption stroke is about 2.6 mm. Hg.

18. A process for removing low concentrations of methane from hydrogen comprising the steps of providing at least two separate zones, each containing and adsorbent bed composed of zeolite A having a pore size of about 4 A.; providing a methane-containing hydrogen feed gas stream and compressing said methane-containing hydrogen feed gas stream to about 50 p.s.i.a.; cooling the compressed methane-containing hydrogen feed gas stream by heat-exchange with a first colder fluid to about 0° C.; passing the cooled and compressed methane-containing hydrogen feed gas stream through the first zeolite A adsorbent bed as an adsorption stroke thereby removing at least most of the methane from said methane-containing hydrogen feed gas stream; discharging a substantially methane-free compressed hydrogen gas stream from said first zeolite A adsorbent bed for heat-exchange with said compressed methane-containing hydrogen feed gas stream as said first colder fluid; simultaneously depressurizing the second zeolite A adsorbent bed and then passing a portion of the product gas stream after being heat-exchanged as the first colder fluid through the adsorbed bed until a residual loading of methane corresponding to a partial pressure of about 2.6 mm. Hg at the adsorption temperature is obtained thereby completing the desorption stroke and removing previously deposited methane and entrapped hydrogen gas in a desorbate gas stream; recycling one portion of the desorbate gas stream to an incoming fresh hydrogen gas stream containing low concentrations of methane-containing hydrogen feed gas stream for passage to said first zeolitic molecular sieve absorbent bed for said adsorption stroke and discarding the other portion of the desorbate gas stream containing the same total quantity of methane as is entering the system in said incoming fresh hydrogen gas stream during said adsorption stroke; periodically switching the flows between the two zeolitic molecular sieve adsorbent beds so that said methane-containing hydrogen feed gas stream flows through the second zeolitic molecular sieve adsorbent bed and said desorbate gas stream is removed from the first zeolitic molecular sieve adsorbent bed.

References Cited in the file of this patent

UNITED STATES PATENTS

| | | |
|---|---|---|
| 2,519,874 | Berg | Aug. 22, 1950 |
| 2,747,681 | Schuftan et al. | May 29, 1956 |
| 2,793,507 | Hnilicka | May 28, 1957 |
| 2,861,651 | Miller | Nov. 25, 1958 |
| 2,882,243 | Milton | Apr. 14, 1959 |
| 2,886,123 | Miller et al. | May 12, 1959 |
| 2,893,512 | Armond | July 7, 1959 |
| 2,918,140 | Brooks | Dec. 22, 1959 |
| 2,944,627 | Skarstrom | July 12, 1960 |

FOREIGN PATENTS

| | | |
|---|---|---|
| 555,482 | Canada | Apr. 1, 1958 |